(12) United States Patent
Hasselberg et al.

(10) Patent No.: US 7,866,371 B2
(45) Date of Patent: Jan. 11, 2011

(54) LOST WAX INVESTMENT CASTING GATING FIXTURES

(75) Inventors: Timothy P. Hasselberg, Middletown, CT (US); Lea D. Kennard, Vernon, CT (US); Carl R. Verner, Windsor, CT (US); Steven J. Bullied, Pomfret Center, CT (US); Mark F. Bartholomew, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 424 days.

(21) Appl. No.: 11/853,964

(22) Filed: Sep. 12, 2007

(65) Prior Publication Data

US 2009/0065168 A1    Mar. 12, 2009

(51) Int. Cl.
*B22C 7/02* (2006.01)
*B22D 9/04* (2006.01)

(52) U.S. Cl. .......................... 164/412; 164/35; 164/45; 164/516

(58) Field of Classification Search ......... 164/516–519, 164/34, 35, 45, 235, 412
See application file for complete search history.

(56) References Cited

U.S. PATENT DOCUMENTS

| 3,985,176 A | 10/1976 | Wamester |
| 4,062,396 A | 12/1977 | Day |
| 4,283,835 A | 8/1981 | Obrochta |
| 5,824,260 A | 10/1998 | Sauerhoefer |
| 5,989,679 A | 11/1999 | Sauerhoefer |
| 6,364,001 B1 | 4/2002 | Cross |
| 6,467,530 B1 | 10/2002 | Bell |
| 6,892,789 B2 | 5/2005 | Boyle |
| 7,048,030 B1 | 5/2006 | Eisele |
| 2006/0292005 A1 | 12/2006 | Pietraszkiewicz |
| 2007/0215315 A1* | 9/2007 | Redemske et al. .......... 164/516 |

* cited by examiner

*Primary Examiner*—Kuang Lin
(74) *Attorney, Agent, or Firm*—Carlson, Gaskey & Olds

(57) ABSTRACT

A method of forming a gating fixture for a lost wax casting process includes determining an optimal orientation of a gate in relation to a part, and forming a fixture that can repeatably be used to consistently locate the gate relative to the part. In one example, stereolithography is used to form the fixture.

11 Claims, 2 Drawing Sheets

LOST WAX INVESTMENT CASTING GATING FIXTURES

TECHNICAL FIELD

The subject invention relates to a gating fixture that is used in a lost wax investment casting process.

BACKGROUND OF THE INVENTION

In a lost wax investment casting process it is important to properly align a wax gate such that a ceramic shell can be adequately filled with molten metal. Proper alignment is also required to ensure proper grain growth as the molten metal cools.

Traditionally, assemblers have manually attached wax gates to a part based on a sample photograph, or by using gating fixtures made from aluminum or wax. In the first situation, assemblers would look at the photograph and then use rulers and protractors to measure gate lengths and degree of orientation with respect to a wax pattern of the part. Wax gates would then be cut out and wax welded to the wax pattern based on the measurements. This process generates a significant amount of human error, with each pattern being assembled differently from the next despite best efforts to provide consistent attachment points.

The use of wax or aluminum fixtures also has disadvantages. Various fixture pieces need to be measured, cut to a desired shape, and then attached to each other to form a finished fixture. These types of fixtures are difficult and time consuming to make. Further, cutting and machining these fixtures wastes material, thereby increasing cost.

Thus, there is a need to provide an improved gating structure for lost wax investment casting processes.

SUMMARY OF THE INVENTION

A method of forming a gating fixture for a lost wax casting process includes determining a proper orientation of a gate in relation to a part, and forming a fixture using an additive forming process such that the fixture can repeatably be used to consistently locate the gate relative to the part.

In one example, stereolithography is used to form the fixture. The fixture includes at least one contoured surface to support the gate and at least one contoured surface to support the part. The contoured surfaces are formed such that the gate and part can only be positioned in one fixed relationship to each other.

In one example, the fixture is comprised of a single piece structure having a base with a plurality of pillars extending outwardly from the base. The first and second contoured surfaces are formed, at least in part, on a portion of the pillars.

The fixture is used as part of a lost wax investment casting process that is described in the following example. A wax pattern of the part is supported on the first contoured surface of the fixture and the gate is supported on the second contoured surface. Next, the gate is wax welded to the wax pattern. More than one gate can be required depending upon the configuration of the part. A ceramic coating is applied to the wax pattern and gate structure to form a ceramic mold. The wax pattern and any associated gates are melted and molten metal is poured into the ceramic mold to form the part.

These and other features of the present invention can be best understood from the following specification and drawings, the following of which is a brief description.

DETAILED DESCRIPTION OF THE PREFERRED EMBODIMENT

Figure 1A:
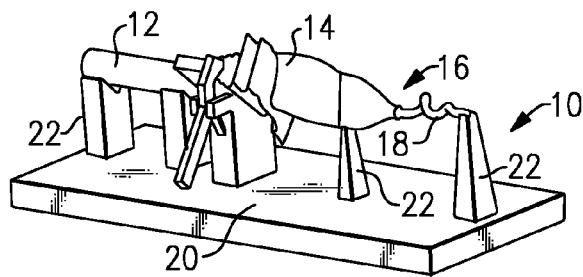
FIG. 1A is a perspective view of a fixture supporting a part and gate.
Figure 1B:
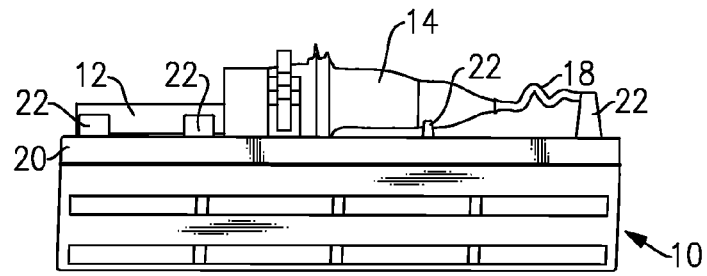
FIG. 1B is a bottom view of the fixture of FIG. 1A.
Figure 1C:
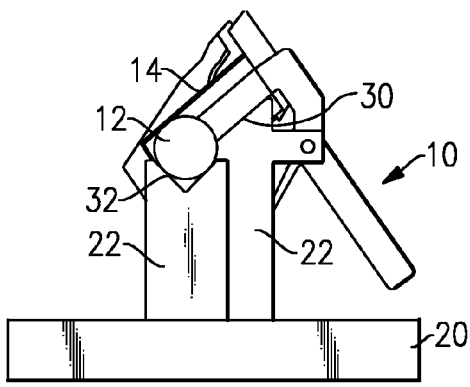
FIG. 1C is an end view of the fixture of FIG. 1A.

A fixture 10 for a lost wax investment casting process is shown in FIGS. 1A-1C. The fixture 10 is used to support one or more gates 12 in a desired orientation relative to a wax mold or pattern 14 of a part to be cast. The gates 12 define fluid flow paths for molten material that is used to form the part during casting.

When a part is to be made from a lost wax investment casting process, a fixture 10 is designed specifically for that part to ensure that gates 12 are set in a proper, i.e., optimal, orientation to the part to ensure adequate filling and proper grain growth during casting of the part.

The fixture 10 can also be used to support a single crystal seed 16 and a single crystal helix 18 that are associated with at least one of the gates 12. Single crystalline structure refers to a structure where all grain boundaries of the material are aligned with each other in a row. The helix 18 is used for orientation purposes to promote such a grain growth for the part during casting. It should be understood that while the fixture 10 is shown as being used with a helix 18 for such a grain structure, the fixture 10 could also be used to form parts that do not require such a structure.

Once an optimal gate orientation relative to the part has been determined, the fixture 10 is formed to ensure that the gates 12 will be repeatedly and consistently positioned relative to the wax pattern 14 for successive castings. An additive process is used to form the fixture 10, such as stereolithography for example. Stereolithography uses a polymer resin material to build up a rigid structure that eventually forms the fixture 10. In one example, the stereolithography process uses a vat of liquid ultra-violet (UV) curable photopolymer resin, for example, and a UV laser to build the fixture a layer at a time. On each layer, a laser beam traces a cross-section pattern of the fixture on a surface of the liquid resin. Exposure to the UV laser light cures or solidifies the pattern traced on the resin and adheres it to the layer below. Once each layer is formed, the rigid structure is moved such that the next layer can be formed.

The fixture 10 is formed as a single-piece component that includes a base portion 20 and a plurality of pillars 22. The pillars 22 extend outwardly from the base portion 20 and are placed in a desired pattern to support the gates 12 and wax pattern 14. While FIGS. 1A-1C show one example pattern, it should be understood that other pillar configurations and patterns could also be used.

Figure 2:
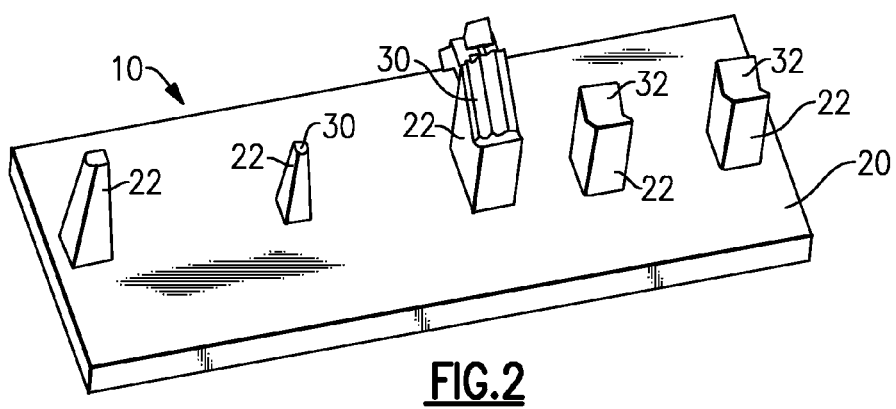
FIG. 2 is a top perspective view of the fixture of FIG. 1A without the part and gate.

The pillars 22 extend outwardly from the base portion 20 as shown in FIG. 2. Top portions of the pillars 22 are contoured to support the gates 12 and wax mold 14 (FIG. 1C). As such, the fixture 10 includes a first contoured surface 30 that supports the wax mold 14 and a second contoured surface 32 that supports the gate 12. The contoured surfaces 30, 32 can be formed as part of a single pillar 22, or can be formed as part of multiple pillars 22 as needed. The contoured surfaces 30, 32 are formed to generally correspond to contoured surfaces on the gate 12 and wax pattern 14 such that the gate 12 and wax pattern 14 can only be positioned in one fixed relationship to each other. In other words, the first contoured surface 30 is formed such that the wax pattern 14 can only be positioned within the fixture 10 in one orientation relative to the gate 12, and the second contoured surface 32 is formed such that the gate 12 can only be positioned on the fixture 10 in one orientation relative to the wax pattern 14. This ensures that the gates 12 are precisely positioned in a consistent position for all castings.

Figure 3:
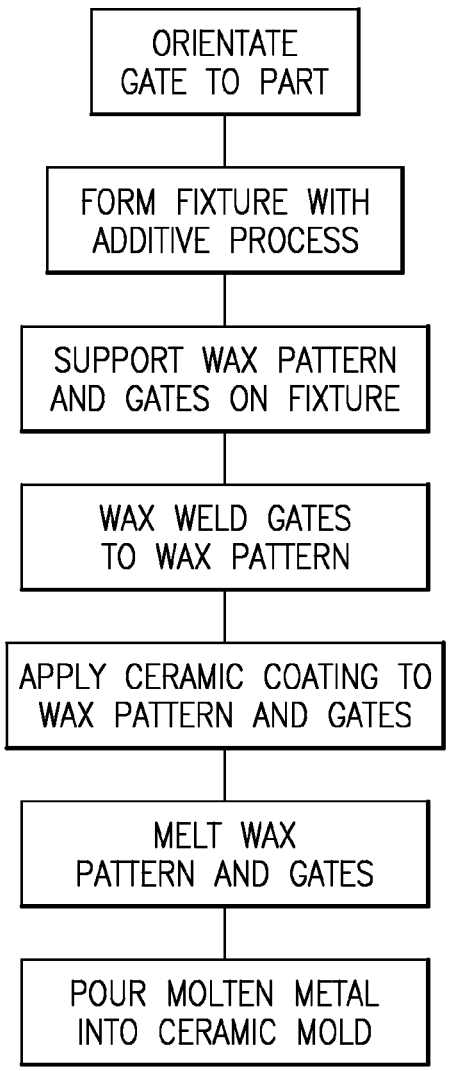
FIG. 3 is a flow chart depicting a method of forming a fixture and subsequently casting a part.

The fixture 10 can be made for any investment cast part such as vanes, blades, test bars, and other components. The method for casting such a part includes the following steps and is shown in FIG. 3. As discussed above, the process begins by determining an optimal orientation of a gate 12 in relation to a part to be cast. Next, a fixture 10 is formed that can repeatably be used to consistently locate the gate 12 relative to the part. The fixture 10 is formed with a first contoured surface 30 for supporting a corresponding contoured surface on the part, and with a second contoured surface 32 for supporting a corresponding contoured surface on the gate 12. An additive process, such as stereolithography, is used to produce the fixture 10.

Once the fixture 10 is produced, a wax pattern 14 of the part is supported on the first contoured surface 30 and the gate 12 is supported on the second contoured surface 32. Once the gate 12 and wax pattern 14 are properly positioned relative to each other, the gate 12 and wax mold 14 are wax welded to each other. Once the gate 12 and wax pattern 14 are welded to each other, they form a single-piece wax structure. A ceramic coating is applied to the wax mold pattern 14 and any associated gate 12 to form a ceramic mold. The wax pattern 14 and gate 12 are then melted leaving an empty ceramic mold. Molten metal is then poured into the ceramic mold to form the part. When the metal cools, the gating structures are cut off and a final finished cast part is formed.

Figure 4:
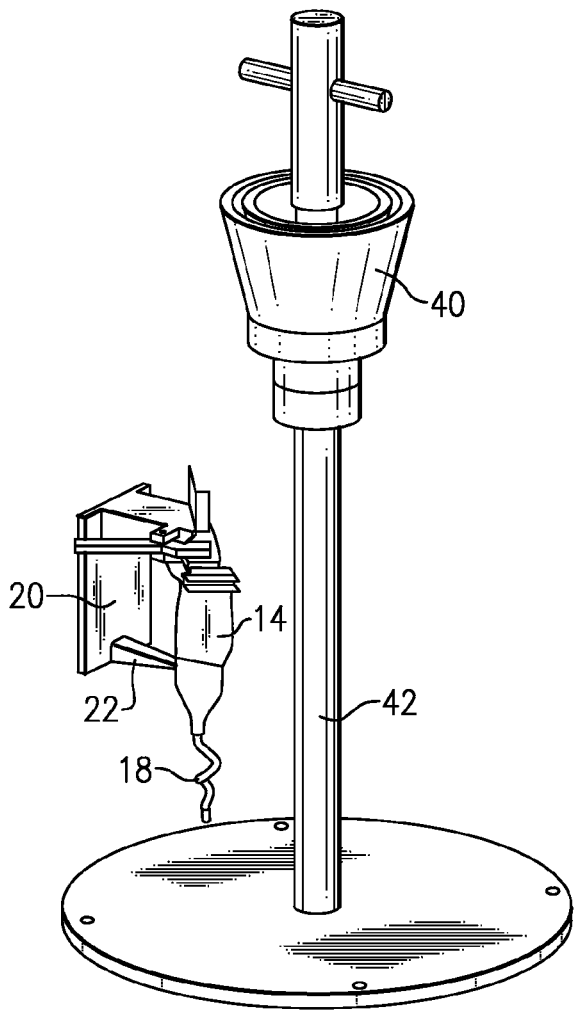
FIG. 4 is an example of an assembly fixture used to attach parts and associated gating for a center pour configuration.

By using the fixture 10 formed from stereolithography, wax gates 12 can be accurately placed in a precise orientation with respect to the wax pattern 14. This allows wax molds and patterns to be easily assembled at a faster pace for higher output. Also, using the fixture 10 or alike will allow for attaching parts radially to a center or common pour cone 40 in order to cast multiple parts at one time. Each part on the assembly will have the same orientation relative to a center post 42 as shown in FIG. 4.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A lost wax gating fixture comprising:
a rigid body including a first contoured surface for holding a part and a second contoured surface for holding at least one gate in a fixed relationship to the part wherein the rigid body is formed as a monolithic structure from a polymer based material, and wherein the monolithic structure includes a base portion with a plurality of integrally formed pillars extending outwardly from the base portion, the first and second contoured surfaces being formed on at least one of the plurality of integrally formed pillars.

2. The lost wax gating fixture according to claim 1 wherein the polymer based material comprises a polymer resin stereolithography material, and wherein the at least one gate can be supported by the lost wax gating fixture in only one orientation relative to the part.

3. The lost wax gating fixture according to claim 2 wherein the first and second contoured surfaces are formed at least in part on top of the at least one of the plurality of integrally formed pillars.

4. The lost wax gating fixture according to claim 2 wherein the second contoured surface supports at least first and second gates in respective fixed relationships to a common part.

5. The lost wax gating fixture according to claim 2 wherein the part comprises a wax pattern and wherein the gate defines a fluid path for molten metal used to form a finished part based on the wax pattern.

6. The lost wax gating fixture according to claim 1 wherein the integrally formed pillars are spaced apart from each other and extend outwardly from the base portion in a desired pattern to support the at least one gate and a wax pattern.

7. The lost wax gating fixture according to claim 6 wherein the first contoured surface is shaped to generally correspond to a shape of a surface of the wax pattern and wherein the second contoured surface is shaped to generally correspond to a shape of a surface of the at least one gate.

8. The lost wax gating fixture according to claim 7 wherein the first and second contoured surfaces are formed on a distal end of at least one of the plurality of integrally formed pillars.

9. The lost wax gating fixture according to claim 8 wherein the first and second contoured surfaces are formed on different pillars.

10. The lost wax gating fixture according to claim 8 wherein the first and second contoured surfaces are formed on a common pillar.

11. The lost wax gating fixture according to claim 8 wherein the first and second contoured surfaces that correspond in shape to respective surfaces on the gate and wax pattern are formed such that the gate and wax pattern can be positioned only in one fixed relationship to each other.

\* \* \* \* \*